United States Patent [19]
Copeland et al.

[11] Patent Number: 5,974,410
[45] Date of Patent: Oct. 26, 1999

[54] METHOD AND SYSTEM FOR FILTERING IN A UNIFORM DATA INTERFACE

[75] Inventors: Bruce W. Copeland, Redmond; Jonathan I. Shuval, Bellevue, both of Wash.

[73] Assignee: Microsoft Corporation, Redmond, Wash.

[21] Appl. No.: 08/672,598

[22] Filed: Jun. 28, 1996

[51] Int. Cl.$^6$ .................................................. G06F 17/30
[52] U.S. Cl. ................................ 707/3; 707/4; 707/103
[58] Field of Search .................................. 707/1, 2, 3, 4, 707/5, 6, 200, 103

[56] References Cited

U.S. PATENT DOCUMENTS

| | | | |
|---|---|---|---|
| 5,313,646 | 5/1994 | Hendricks et al. | 395/600 |
| 5,530,853 | 6/1996 | Schell et al. | 395/600 |
| 5,701,467 | 12/1997 | Freeston | 395/611 |
| 5,715,444 | 2/1998 | Danish et al. | 395/604 |
| 5,715,449 | 2/1998 | Peters Jr. et al. | 395/613 |
| 5,752,242 | 5/1998 | Havens | 707/3 |
| 5,815,703 | 9/1998 | Copeland et al. | 395/613 |
| 5,819,258 | 10/1998 | Vaithyanathan et al. | 707/2 |
| 5,826,254 | 10/1998 | Kahn | 707/5 |

OTHER PUBLICATIONS

*Administrator's Guide, Microsoft Systems Management Server, Version 1.0,* Microsoft Corporation, Redmond, Washington, 1993–1994, Chap. 1, 2, 3, 10, 11, 12, 13, and 14; Appendix A and F.

Brockschmidt, Kraig, *Inside OLE 2,* Microsoft Press, Redmond, Washington, 1994, Chap. 1 and 3.

Desktop Management Task Force, "Desktop Management Interface Specification v2.0," http://www.dmtf.org, Mar. 27, 1996.

*Primary Examiner*—Paul V. Kulik
*Assistant Examiner*—Michael J. Wallace, Jr.
*Attorney, Agent, or Firm*—Seed and Berry LLP

[57] ABSTRACT

A computer-based uniform data interface (UDI) system for accessing in a uniform manner data from a data source with an arbitrary organization. The UDI system provides a UDI application programming interface (API) with functions for creating and accessing data organized into containers that contain one or more folders. Each folder optionally contains sub-folders and scalars. The UDI system also provides a UDI registry for registering types of containers and folders supported by a data source, for enumerating the types of containers and folders supported by the data source, and for instantiating container and folder objects corresponding to the data of the data source. A UDI mapper is provided for registering with the UDI registry types of containers and folders that represents the data of the data source, for instantiating in memory container and folder objects of the registered types, and for populating an instantiated container object with folders representing the data from the data source that is within the container. An application program invokes the UDI API functions to access data of data sources with arbitrary organizations.

26 Claims, 11 Drawing Sheets

METHOD AND SYSTEM FOR FILTERING IN A UNIFORM DATA INTERFACE

TECHNICAL FIELD

This invention relates generally to a computer system for accessing data, and more specifically, to a method and system for providing a uniform data interface for accessing data that is arbitrarily organized.

BACKGROUND OF THE INVENTION

Computer systems organize data sources in a variety of ways. For example, data can be organized as a relational database, as a hierarchical database, as a flat file, as a spreadsheet, etc. Application programs, in general, can only access data sources with organizations and implementations that the developers of the applications program were aware of at the time of development. Thus, these applications not only cannot access other data sources, but also may not be able to access revisions to these data sources. Applications thus need to be customized to organizations and implementations of the particular data source whose data is to be used by the application.

The customization of applications can be very expensive, time-consuming, and problematic for both developers of the applications and suppliers of the data sources. A developer would need to modify, test, and redistribute the application for each new data source. However, a supplier of a data source with a new organization may find it virtually impossible to survive if no application can access the new data source. If a supplier of a data source uses a new organization, then existing applications cannot access that data source. Thus, such suppliers are at a competitive disadvantage to other suppliers who provide data sources in an organization for which the applications have been customized. Although the new organization may be superior to the existing organization, it may thus fail to gain wide acceptance.

SUMMARY OF THE INVENTION

The present invention provides a computer-based uniform data interface (UDI) system for accessing in a uniform manner data from a data source with an arbitrary organization. The UDI system provides a uniform model that organizes data into containers, folders, and scalars. The UDI system comprises a UDI application programming interface (API), a UDI registry, and a UDI mapper.

The UDI API has functions for creating and accessing data organized into containers. Each container has one or more folders which optionally contain sub-folders and scalars. The UDI registry registers types of containers and folders supported by a data source, enumerates the types of containers and folders supported by the data source, and instantiates container and folder objects corresponding to the data of the data source. The UDI mapper registers with the UDI registry types of containers and folders that represents the data of the data source, instantiates in memory container and folder objects of the registered types, and populates an instantiated container object with folders representing the data from the data source that is within the container. The UDI mapper is data source specific and maps the data source into the UDI model using the UDI registry and helper classes provided by the UDI system. Application programs are developed to access data sources using the UDI API. Thus, the application program can access any data source that has a UDI mapper to map its organization to the UDI model.

DETAILED DESCRIPTION OF THE INVENTION

I. Overview

Figure 1:
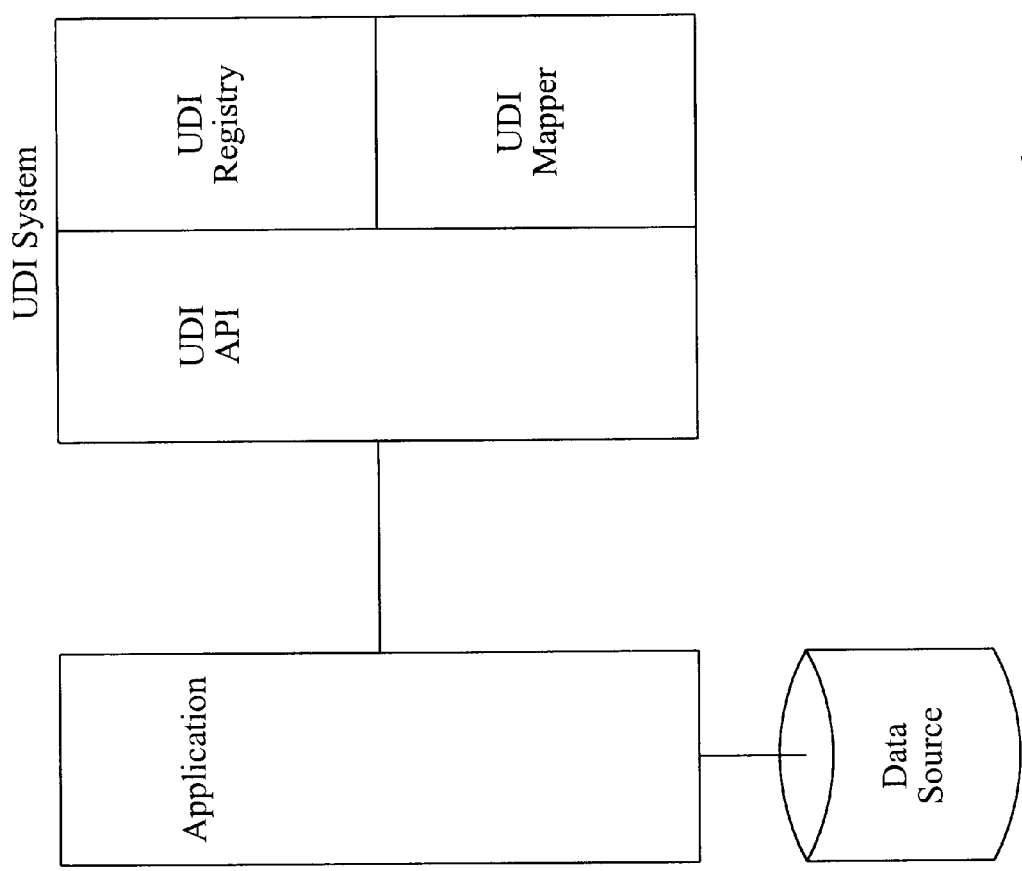
FIG. 1 is a block diagram of the components of the UDI system.

The present invention provides a Uniform Data Interface (UDI) for uniformly interfacing with data from a data source that is arbitrarily structured. In a preferred embodiment, the UDI system defines a model for uniformly representing data objects of the data source. The UDI model organizes the data objects hierarchically into containers, folders, and scalars. At the top of the hierarchy is a container for each type of data object in the data source. Each container contains one or more folders. Each folder can contain other folders (sub-folder) and scalars. The containers and the folders form the hierarchy and the scalars contain the data. A different type of container is defined for each type of data object. For example, if the data source contains data describing the computer systems of a company, the data may be organized by company sites, domains, and machines (computers). Thus, one type of container may be for the site data objects (i.e., site container), another type of container may be for the domain data objects (i.e., domain container), and one type of container may be for the machine data objects (i.e., machine container). Each container may contain folders of various types. Each folder corresponds to an instance of a data object. For example, a site container may contain a folder of type site (a site folder) with data for each site within the company. Each folder may contain folders and scalars of various types. For example, a site folder may contain other site folders, domain folders, or scalars describing the attributes of the site. That is, a site may contain sub-sites.

The UDI system provides an application programming interface (API) that allows applications to access data using the UDI model. Applications that use the UDI can be connected to any data source that supports the UDI model. For example, a generic browser can be developed to display the information relating to the types of containers, folders, and scalars defined for a data source along with the data of the data source using the UDI model. The generic browser can be used for every data source that supports the UDI model. By using the UDI API, application programs can be written to access the data regardless of the underlying organization of the data. Thus, an application program can access different data sources with different organizations without modifying the application program. The UDI API provides functions for connecting to a data source, for determining the types of containers, folders, and scalars that are in the data source, for opening a container, for defining selection criteria (i.e., filters) for the folders within a container, for populating containers with folders that pass the filter, and for retrieving the data of the scalars. The term "populating" refers to the process in which folders that pass the defined filters are bound to the opened container.

The UDI model also allows for filters to be applied to a container. The filters can be transient or persistent. A transient filter exists only while the application that defined the filter executes. A persistent filter is stored along with the data source. Thus, a persistent filter can be retrieved from the data source during subsequent executions of application programs. For example, an application can specify that the site container should be filtered so that the site container is populated with data only for sites in the United States. That filter can be transient or persistent.

Not all filters that are applied to a container are activatable by the container to filter folders directly contained within the container. Rather, some filters may be activatable by those folders to filter sub-folders of those folders. Consequently, when a container is populated, filters percolate down to the sub-folders in which they are activatable. Each container type has a list of applicable filter types and a list of activatable filter types. Also, each folder type has a list of activatable filter types. Any filter that is applied to a container or passed to a folder is checked to determine whether its filter type is in the activatable list. If the filter is not activatable, then it is passed to the next lower folder in the hierarchy. A parent (i.e., container or folder) is populated with all folders that pass the activatable filters for that parent without regard to whether a folder will be empty or not. A folder may be empty if none of its sub-folders pass the activatable filters that are passed from the container to the folder.

The UDI system also provides a mechanism for connecting the application to an arbitrary data source. The application provides a data structure to the UDI system containing information needed by the data source. The UDI system passes this data structure to the data source to establish the connection. The UDI system returns a handle, which the application uses to identify the data source when invoking the functions of the UDI API.

FIG. 1 is a block diagram of the components of the UDI system. The UDI system executes on a computer system with a central processing unit and memory. The UDI system is typically stored on a computer-readable storage medium, such as a disk. The UDI system 101 comprises the UDI API 102, a UDI Registry 102, and a UDI mapper 103. The UDI API functions are data source independent functions through which application programs access various data sources. The UDI mapper provides functions that are invoked by the UDI API functions and that map the organization of the source data into the UDI model. In addition, the UDI system provide several base class implementations to aid in the implementation of the UDI mapper. The UDI Registry provides helper functions for use by the UDI API and the UDI mapper.

II. Uniform Data Independent (UDI) API Functions

The UDI API provides functions for creating, modifying, examining, and deleting data in a data source. These functions are categorized as connection functions, container functions, folder functions, scalar functions, filter container functions, filter functions, and static information functions.

A. Connection Functions

The connection functions enable an application to connect to a data source and disconnect from the data source. The UDI system allows applications to connect to arbitrary data sources. The UDI system receives from the application a data structure that specifies the data source in a data source dependent manner. To establish a connection, the UDI system invokes a data source dependent connection function provided by the data source to connect to the data source. The UDI system provides to the application a handle to identify the data source when accessing a container within that data source.

UDI_STATUS UDIDataSourceConnect(DATASOURCE *pd, HANDLE *phConn);

The UDIDataSourceConnect function connects the application to the data source specified by the data source (pd) and returns a handle (phConn) to the data source. Before calling this function, the application sets the appropriate values for the members in data structure. For example, if the data source is an SQL server, the data structure would contain the server name, user name, password, database, public encryption key, and a pointer to a decryption function. This data structure is preferably a union so that data appropriate for different data sources can be represented in this data structure. The handle is used to open, access, and close containers in the data source. This function instantiates a connection object and invokes a connection function that is provided by the supplier of the data source. Since the function is provided by the supplier of the data source, that function can parse the specified data structure to access the data source.

UDI_STATUS UDIDataSourceDisconnect(HANDLE *phConn);

The UDIDataSourceDisconnect function disconnects from the specified data source (phConn). This function destroys the connection object that was instantiated when the connection was established. Any destructor function implemented by the supplier of the data source is performed.

B. Container Functions

The Container functions enable an application to open a container, apply a filter to a container, populate a container with folders, retrieve a folder from a container, retrieve the number of folders in a container, and close a container. According to the UDI model, a data source contains various types of containers that contain the data of the data source in folders. When a container is first opened, it is empty, that is, contains no folders. To fill the container, the application invokes a populate function. Prior to populating the container, an application can apply filters to the container to specify criteria indicating which folders are to populate the container, when the populate function is invoked. If no filters are applied, then the container is populated with all the folders within the data source.

UDI_STATUS UDIOpenContainer(DWORD cType, HANDLE hConnection, HANDLE *phContainer);

The UDIOpenContainer function opens a container for the specified type (cType) of data for which the application wants to access in the specified data source (hConnection). The function returns a handle (phContainer) to a container object. This function invokes the OttNewContainer function of the UDI registry (discussed below) to instantiate the container object corresponding to the specified type.

UDI_STATUS UDICloseContainer(HANDLE hContainer);

The UDICloseContainer function closes the specified container (hContainer). When an application closes a container, the UDI system does not automatically close any open folders within the container. The application needs to explicitly close folders that have been opened using UDICreateFolder, UDIGetNextFolder, or UDIGetFolder-ByID functions. Therefore, an application can open the folders within a container, then close the container, and still have access to the folders. This function destroys the container object corresponding to the specified container.

UDI_STATUS UDIPopulate(HANDLE hContainer, DWORD dwOptions, HANDLE hEvent);

The UDIPopulate function fills the container (hContainer) with folders from the data source that satisfy the criteria specified by the applied filters. When a container is populated, the UDI system creates a folder object corresponding to each folder within the container that satisfies the criteria (i.e., passes the filter). In a preferred embodiment, the folder object is not actually created until the folder is accessed. The UDIPopulate function instead creates a "seed" object when the container is populated. The seed object contains information describing the folders that are to fill the container. When a folder is eventually accessed (e.g., by invoking the UDIGetNextFolder function), the information from the seed object is used to instantiate the folder object. When a folder object is instantiated, its sub-folders are likewise not created until accessed. This delayed instantiation improves performance by reducing memory requirements since folder objects for only those objects that are actually accessed are created. This function invokes the Populate method of the specified container object. The container can be populated in an asynchronous or synchronous manner as specified by the parameter (dwOptions). If a synchronous manner is specified, then this function returns to the application program only after the container has been populated. If an asynchronous manner is specified, then the function returns immediately to the application. The UDI system then populates the container and notifies the application using the specified event object (hEvent) when the populating completes. The specified event object can send a message to window or set a flag to notify the application that the populating is complete. The application can check the flag to determine whether the populating is complete. The folders retrieved represent the folders in the container at the time this function is invoked. Any folders added to the data source after the populating is complete are not reflected in the list of folders within the container. To get the latest information from the data source, the application opens and populates a new container and then accesses the information in the new container.

UDI_STATUS UDISetFilter(HANDLE hContainer, HANDLE hFilter);

The UDISetFilter function applies the specified filter (hFilter) to the specified container (hContainer). This function invokes a SetFilter method of the container object. Filters can only be applied to containers. However, a filter may not be activatable to filter the first level of folders within a container. The type of the filter applied must be in the applicable filter list. If the filter type is not applicable to the container, the function does not apply the filter. When multiple filters are applied to a container, the result is the intersection of those folders that pass the filters. After the UDISetFilter function applies a filter to a container, the container keeps a copy of the filter for its own use. This means that any changes made to the filter are not reflected in the filter that has been applied to the container and the filter at this point can be closed.

C. Folder Functions

The UDI system accesses data in the data source as folders. The folder functions enable applications to create, open, modify, delete, and close folders. They also enable applications to obtain the information contained within the folders. Scalars and sub-folders can be retrieved sequentially or by ID. In addition, these functions allow retrieval of information about a folder, such as its ID, name, type, number of sub-folders, and the number of scalars.

UDI_STATUS UDICreateFolder(HANDLE hParent, DWORD fType, HANDLE *phFolder);

The UDICreateFolder function creates a new folder of the specified type (fType) within the specified parent container or folder (hParent). The function returns a handle (phFolder) to the newly created folder object. The function invokes the CreateFolder method of the parent object to create a folder object. A newly created folder is empty, that is, it has no values for the scalars or sub-folders within it. An application sets the scalars for the new folder using the UDISetScalar function. A newly created folder is not automatically linked to its parent folder. Linking associates the new folder to its parent within the application's memory and is performed by invoking the UDI LinkFolder function. To add the new folder to the data source, the application uses the UDICommitFolder function. When an application creates a folder, the usage count for the new folder is set to 1. When the folder is closed by invoking the UDICloseFolder function, the usage count is decremented and if zero, then memory for the folder object is decremented.

UDI_STATUS UDICloseFolder(HANDLE hFolder);

The UDICloseFolder function closes the specified folder (hFolder). The function invokes the Close method of the folder object. The memory allocated for the folder object is not deallocated until the usage count for the folder is zero, that is, when all handles to the folder are closed and the container itself is closed using the UDICloseContainer function. Closing a folder renders the handle invalid. Closing a folder does not cause its sub-folders to be closed automatically. The usage count of a parent is incremented for each direct sub-folder. In this way, the memory for the parent will not be deallocated as long as at least one sub-folder is still allocated.

UDI_STATUS UDICommitFolder(HANDLE hFolder);

The UDICommitFolder function writes any changes to a folder to the data source. This function invokes the Commit method of the folder object. The UDICommitFolder function is the only function that modifies the data source. When an application creates a folder, it invokes the UDICreateFolder function to create the folder (within the application's memory), sets the scalars for the new folder, adds sub-folders, links the new folder to its parent (within the memory of the application), and calls the UDICommitFolder function to write the folder to the data source. When an application deletes a folder, it invokes the UDIUnlinkFolder function to unlink the folder from its parent (within the memory of the application), and invokes the UDICommitFolder function to delete the folder from the data source. Some types of folders require their parent folder to be committed. These folders are not written to the data source until their parent folder is committed. If a folder requires its parent to be committed, the UDICommitFolder function returns an indication.

UDI_STATUS UDIEnumFolderTypes(HANDLE hParent, DWORD *pfTypes, DWORD *pctFolderTypes);

The UDIEnumFolderTypes function returns an array (pfTypes) and a count (pctFolderTypes) of the types of sub-folders supported by the specified container or folder (hParent). This function invokes the GetFolderTypes method of the parent object.

UDI_STATUS UDIGetFolderByID(HANDLE hParent, DWORD fType, char *pszFolderID, HANDLE *phSubFolder);

The UDIGetFolderByID function returns the handle (phSubFolder) to the folder with the specified ID (pszFolderID) from the specified container or folder (hParent). This function invokes the GetFolderByID method of the parent object.

UDI_STATUS UDIGetFolderCount(HANDLE hParent, DWORD fType, DWORD *pctFolders);

The UDIGetFolderCount function returns the number (pctFolders) of folders contained in the specified container or folder (hParent) of the specified type (fType). This function invokes the GetFolderCount method of the parent object.

UDI_STATUS UDIGetFolderID(HANDLE hFolder, char *pszFolderID);

The UDIGetFolderID function returns the ID (pszFolderID) of the specified (hFolder) folder. This function invokes the GetID method of the folder object.

UDI_STATUS UDIGetFolderType(HANDLE hFolder, DWORD *pfType, char *pszfType);

The UDIGetFolderType function returns a type of the specified folder (hFolder) as both an integer value (pfType) and as a string value (pszfType). This function invokes the GetFolderType method of the folder object.

UDI_STATUS UDIGetNextFolder(HANDLE hParent, DWORD fType, HANDLE *phFolder);

The UDIGetNextFolder function returns the handle (phFolder) to the next folder in the specified container or folder (hParent) of the specified type (fType). This function invokes the GetNextFolder method of the parent object. The handles to the folders are returned sequentially. For sub-folders within a folder, an application uses the UDIRewind function to start at the beginning of the folder list. For top-level folders within a container, the folder list cannot be rewound. To start at the beginning of such top-level folders, an application closes the container and then opens, sets filters, and populates the container again.

UDI_STATUS UDIRewind(HANDLE hHandle, DWORD dwOptions);

The UDIRewind function rewinds the container, folder, or filter container specified by the passed handle (hHandle). The rewind resets the container, folder, or filter container so that either the folders, scalars, or filters (dwOptions) can be retrieved from the beginning. This function invokes the Rewind method of the object specified by the passed handle.

UDI_STATUS UDILinkFolder(HANDLE hFolder);

The UDILinkFolder function links the specified folder (hFolder) to its parent. This function invokes the Link method of the folder object. The function inserts the specified folder at the beginning of the folder list of the parent.

UDI_STATUS UDIUnlinkFolder(HANDLE hFolder);

The UDIUnlinkFolder function unlinks the specified folder (hFolder) from its parent. This function invokes the Unlink method of the folder object.

D. Scalar Functions

The scalar functions enable an application to read and set the value of scalars of a folder.

UDI_STATUS UDIGetNextScalar(HANDLE hFolder, SCALAR *pScalarStruct);

The UDIGetNextScalar function returns the next scalar (pScalarStruct) in the list of scalars within the specified folder (hFolder). This function invokes the GetNextScalar method of the folder object. The scalars can be rewound by the UDIRewind function.

UDI_STATUS UDIGetScalarByName(HANDLE hFolder, const char *pszName, SCALAR *pScalarStruct);

The UDIGetScalarByName function returns the scalar (pScalarStruct) with the specified scalar name (pszName) from the specified folder (hFolder). This function invokes the GetScalarByName method of the folder object.

UDI_STATUS UDIGetScalarCount(HANDLE hFolder, DWORD *ptScalars);

The UDIGetScalarCount function returns the count (pctScalars) of scalars in the specified folder (hFolder). This function invokes the GetScalarCount method of the folder object.

UDI_STATUS UDISetScalar(HANDLE hFolder, SCALAR *pScalarStruct);

The UDISetScalar function sets the value of the specified scalar (pScalarStruct) within the specified folder (hFolder). This function invokes the SetScalar method of the folder object.

E. Filter Container Functions

The filter container functions enable an application to open and close filter containers, retrieve persistent filters from filter containers, retrieve the ID for a persistent filter, rewind the filters within a filter container, and write filters (queries) to the data source.

UDI_STATUS UDIOpenFilterContainer(HANDLE hConnection, HANDLE *phFContainer);

The UDIOpenFilterContainer function opens the filter container for the specified connection (hConnection) and populates the filter container with persistent filters, and returns the filter container (phFContainer). This function instantiates a filter container object passing a reference to the specified connection.

UDI_STATUS UDICloseFilterContainer(HANDLE hFContainer);

The UDICloseFilterContainer function closes the specified filter container (hFContainer). If there are no other references to the filters within the filter container, the function closes all filters within the filter container and frees the memory associated with them. This function destroys the filter container object.

UDI_STATUS UDICommitFilter(HANDLE hFilter, HANDLE hFContainer);

The UDICommitFilter function writes the specified transient filter (hFilter) to the specified filter container (hFContainer). When a filter is written to the data source, it becomes a persistent filter. This function invokes Commit method of the filter object passing a reference to the specified filter container.

UDI_STATUS UDIGetFilterByID(HANDLE hFContainer, DWORD frType, const char *pszID, HANDLE *phFilter);

The UDIGetFilterByID function returns the persistent filter (phFilter) of the specified filter type (frType) and with the specified ID (pszID) from the specified filter container (hFContainer). This function invokes the GetByID method of the filter container object.

UDI_STATUS UDIGetFilterID(HANDLE hFilter, char *pszID);

The UDIGetFilterID function returns the ID (pszID) of the specified persistent filter (hFilter). This function invokes the GetID method of the specified filter object.

UDI_STATUS UDiGetNextFilter(HANDLE hFContainer, DWORD frType, HANDLE *phFilter);

The UDIGetNextFilter function retrieves the persistent filter (phFilter) of the specified type (frType) from the specified filter container (hFContainer). This function invokes the GetNext method of the filter container object. The function opens the next filter in the filter container. This filter remains open until it is closed using the UDICloseFilter function. The memory allocated for the filter is not deallocated until the usage count for the filter is zero, that is, when all handles to the filter are closed and the filter container itself is closed using the UDICloseFilterContainer function. Because this function reads filters sequentially, an application resets the filter list to start at the beginning of the list again using the UDIRewind function.

F. Filter Functions

Before populating a container, an application can set filters on the container to specify criteria used to select the folders to retrieve from the data source. An application can configure a filter by adding tokens to the filter. There are two types of tokens: expression tokens and control tokens. An expression token defines how to search for objects that have a specified relationship to a specified value for a specified attribute (e.g., age$\geq$21). A control token can be a logical operator or parentheses (i.e., AND and OR). A logical operator defines the relationship between two adjacent expressions. Parentheses enable expressions to be grouped together. The tokens within a filter are indexed. For example, the filter "(Age$\geq$21) AND sex=male" has 5 tokens indexed from 0–4. The first, third, and fourth tokens are the control tokens: ")," "(," and "AND." The second and fifth tokens are the expression tokens: "Age$\geq$21" and "sex=male."

The filter container functions enable an application to create and close filters, add tokens to a filter, manipulate existing tokens (delete, group, and ungroup), get the count of tokens within a filter, and get the filter type. The UDIGetAllFilters function enables an application to retrieve the list of filters applied to a container.

UDI_STATUS UDICreateFilter(DWORD frType, HANDLE hConnection, HANDLE *phFilter);

The UDICreateFilter function creates a filter (phFilter) of the specified type (frType) for the specified connection (hConnection). This function invokes the OttCreateFilter function of the UDI Registry to create a filter object.

UDI_STATUS UDICloseFilter(HANDLE hFilter);

The UDICloseFilter function closes the specified filter (hFilter). This function invokes the Close method of the filter object. When UDICloseFilter is used to close a transient filter, the memory associated with a filter is deallocated. A transient filter is opened when the UDICreateFilter function creates a filter object. When UDICloseFilter is used close a persistent is filter, the usage count is decremented but the memory associated with the filter is not deallocated until its usage count is zero. When an application calls UDIGetFilterByID or UDIGetNextFilter to retrieve a handle to a filter, the usage count of that filter increases by 1. The memory allocated to that filter object is not freed until an application closes all handles to the filter and closes the filter container. Once a filter has been applied to a container using UDISetFilter, an application can close it.

UDI_STATUS UDIAddToken(HANDLE hFilter, ANDOR opAndOr, TOKEN *pTokenInfo, INT iIndex);

The UDIAddToken function adds the specified token (pTokenInfo) at the specified index (iIndex) in the specified filter (hFilter) with the specified control token (opAndOr). This function invokes the AddToken method of the filter object. Two special values for the specified index indicate the start and end of the filter expression.

UDI_STATUS UDIGetAllFilters(HANDLE hContainer, HANDLE *pahFilters DWORD *pctFilters);

The UDIGetAllFilters function returns a list (pahFilter) and a count (pctFilters) of all the filters that have been applied to the specified container (hContainer). This function invokes the RetrieveFilters method of the container object.

UDI_STATUS UDIGetFilterType(HANDLE hFilter, DWORD

*pFilterType, char *pszTag);

The UDIGetFilterType function returns the filter type (pFilterType) and filter tag (pszTag) for the specified filter (hFilter). This function invokes the GetType method of the filter object.

```
UDI_STATUS UDIGetToken(HANDLE hParent, INT iIndex,
    TOKEN *pTokenInfo);
```

The UDIGetToken function returns the token (pTokenInfo) at the specified index (iIndex) from the specified filter (hFilter). This function invokes the GetToken method of the filter object.

```
UDI_STATUS UDIGetTokenCount(HANDLE hFilter, DWORD
    *pctTokens);
```

The UDIGetTokenCount function retrieves the number (pctTokens) of tokens in the specified filter (hFilter). This function invokes the GetTokenCount method of the filter object.

```
UDI_STATUS UDIManipulateTokens(HANDLE hFilter,
    DWORD dwFlags, INT iStart, INT iEnd);
```

The UDIManipulateTokens function deletes, groups, or ungroups tokens (dwFlags) within the specified range (iStart, iEnd) for the specified filter (hFilter). This function invokes the GroupTokens, UngroupTokens, and DeleteTokens methods (as appropriate) of the filter object. The grouping and ungrouping refers to adding or removing of parentheses.

G. Static Information Functions

The static information functions enable an application to retrieve general information about containers, folders, and filters.

```
UDI_STATUS UDIAPIVer(char **ppVersion);
```

The UDIAPIVer function returns the version string (ppVersion) that identifies the version of the UDI API.

```
UDI_STATUS UDIDescribeFolder(BASETYPE tType, DWORD
    dwTag, FOLDER_INFO **ppFInfo);
```

The UDIDescribeFolder function returns information (ppFInfo) about the properties of the specific type (dwTag) of container or folder (tType). This function invokes the OttDescribeFolder function of the UDI Registry.

```
UDI_STATUS UDIEnumContainers(FOLDER_INFO **ppData,
    DWORD *pCount);
```

The UDIEnumContainers function returns an array (ppData) and a count (pCount) of FOLDER_INFO structures of all container types currently registered in the registry. This function invokes the OttEnumContainers function of the UDI Registry.

```
UDI_STATUS UDIEnumFilters(FILTER_INFO *paFI, DWORD
    *pCount);
```

The UDIEnumFilters function returns an array (ppData) and a count (pCount) of FILTER_INFO structures for each filter types that are currently registered in the registry. This function invokes the OttEnumFilters function of the UDI Registry.

```
UDI_STATUS UDIEnumFolders(FOLDER_INFO **ppData,
    DWORD *pCount);
```

The UDIEnumFolders function returns an array (ppData) and a count (pCount) of FOLDER_INFO structures for all folder types registered in the registry. This function invokes the OttEnumFolders function.

H. Data Structures

DATASOURCE

```
typedef union {
    GENERIC type;
    SQL_CONNECT_PARAMS sqlParams;
    DIR_PARAMS dirParams;
} DATASOURCE;
```

The DATASOURCE structure is a union of structures that specifies the data source to which your application needs to connect. The DATASOURCE union is used by the UDIDataSourceConnect function. Before calling UDIDataSourceConnect, the application sets the appropriate values for the members in the DATASOURCE. For SQL Server, the application sets the server name, user name, password, database, public encryption key, and a pointer to a decryption function for the sqlParams structure within the DATASOURCE union.

FILTER_INFO

```
typedef struct_FILTER_INFO {
    char szTag[NAME_SIZE];
    DWORD filterType;
    char szName[NAME_SIZE];
    char szValue[NAME_SIZE];
    char szOperator[NAME_SIZE];
} FILTER_INFO;
```

The FILTER_INFO structure contains information about a filter. The following members of this structure indicate whether the corresponding member in the TOKEN structure is required when adding an expression token to a filter of the type (filter type) szName, szValue, and szOperator. If the member contains a string, this indicates that the corresponding member in the TOKEN structure is required when an application adds an expression to a filter of that type. If the member is NULL, this indicates that the corresponding member in the TOKEN structure is not required for expression tokens in filter of that type. The structure also contains a string for the name (szTag) of the filter.

FOLDER_INFO

```
typedef struct_FOLDER_INFO {
    BASETYPE tObjectity;
    char *pszTag;
    DWORD dwTag;
    DWORD ctFolders;
    DWORD *pFolderTags;
    DWORD ctFilters;
    DWORD *pFilterTags;
    DWORD ctScalars;
    SCALAR_INFO *pScalars;
    void *pNewFunc;
} FOLDER_INFO;
```

The FOLDER_INFO structure contains information that describes the properties of a folder or container. The FOLDER_INFO structure contains information about the type of object (tObjectity), a string name (pszTag), an integer identifier of the object (dwTag), the count (pctFolder) and type (pcFolderTag) of folders that can be within objects of this type, the count (ctFilters) and the type (pFilterTags) of the filters that can be applied to containers or folders of this type, the count (ctScalars) and type (pScalars) of the scalars that can be within containers or folders of the type, and a reference to a function initializing object of this type.

SCALAR

```
typedef struct_SCALAR {
    SCALARTYPE scType;
    char *pszName;
    char *pszValue;
    DWORD dwValue;
    time_t tValue;
    void *pValue;
    DWORD dwLen;
    BOOL bStringEquivalence;
    DWORD fAccess;
} SCALAR;
```

The SCALAR structure contains information about a specific scalar within a folder. All scalars have a type, a name, a value, and an access mode. The SCALAR structure contains separate members for the value for each scalar type. The data members include the scalar type (scType), the name of the scalar (pszName), the value of a string or binary scalar (pszValue), the value of an integer scalar (dwValue), the value of a time scalar (tValue), a flag (bStringEquivalence) indicating whether a string (pszValue) contains the string equivalent for a time or integer scalar, and the access mode (fAccess) of the scalar (e.g., read only).

SCALAR_INFO

```
typedef struct_SCALAR_INFO {
    char szName[BUFF_SIZE];
    SCALARTYPE scType;
    DWORD fAccess;
} SCALAR_INFO;
```

The SCALAR_INFO structure contains information that describes the properties of a scalar in a folder. The SCALAR structure contains information about a specific scalar within a folder (including its value and the specific properties of the value such as the length of a string scalar). In short, the SCALAR_INFO structure is used to get the general properties of a certain kind of scalar and the SCALAR structure is used to store the actual value of a specific scalar within a specific folder. The data members include the name (szName), type (scType), and access node (fAccess) of the scalar.

TOKEN

```
typedef struct)TOKEN {
    INT tokenType;
    char szName [BUFF_SIZE];
    char szValue [BUFF_SIZE];
    DWORD dwOp;
    char szTokenString [BUFF_SIZE];
} TOKEN;
```

The TOKEN structure contains information about a token. There are two types (token Type) of tokens: expression tokens and control tokens. An expression token defines how to search for data that have a specified relationship (dwOp) to a specified value (szValue) for a specified attribute (szName). An expression token is made up of an attribute, a relational operator, and a comparison value. A relational operator (such as is equal to or is like) defines how the specified value should be compared with the actual value stored for the specified attribute. A control token can be a logical operator or parentheses. A logical operator connects two expression tokens, two subclauses, or a combination of an expression and a subclause. A logical operator defines the relationship between two adjacent expressions or subclauses. Parentheses enable expressions to be grouped together.

III. UDI Registry

Figure 2:
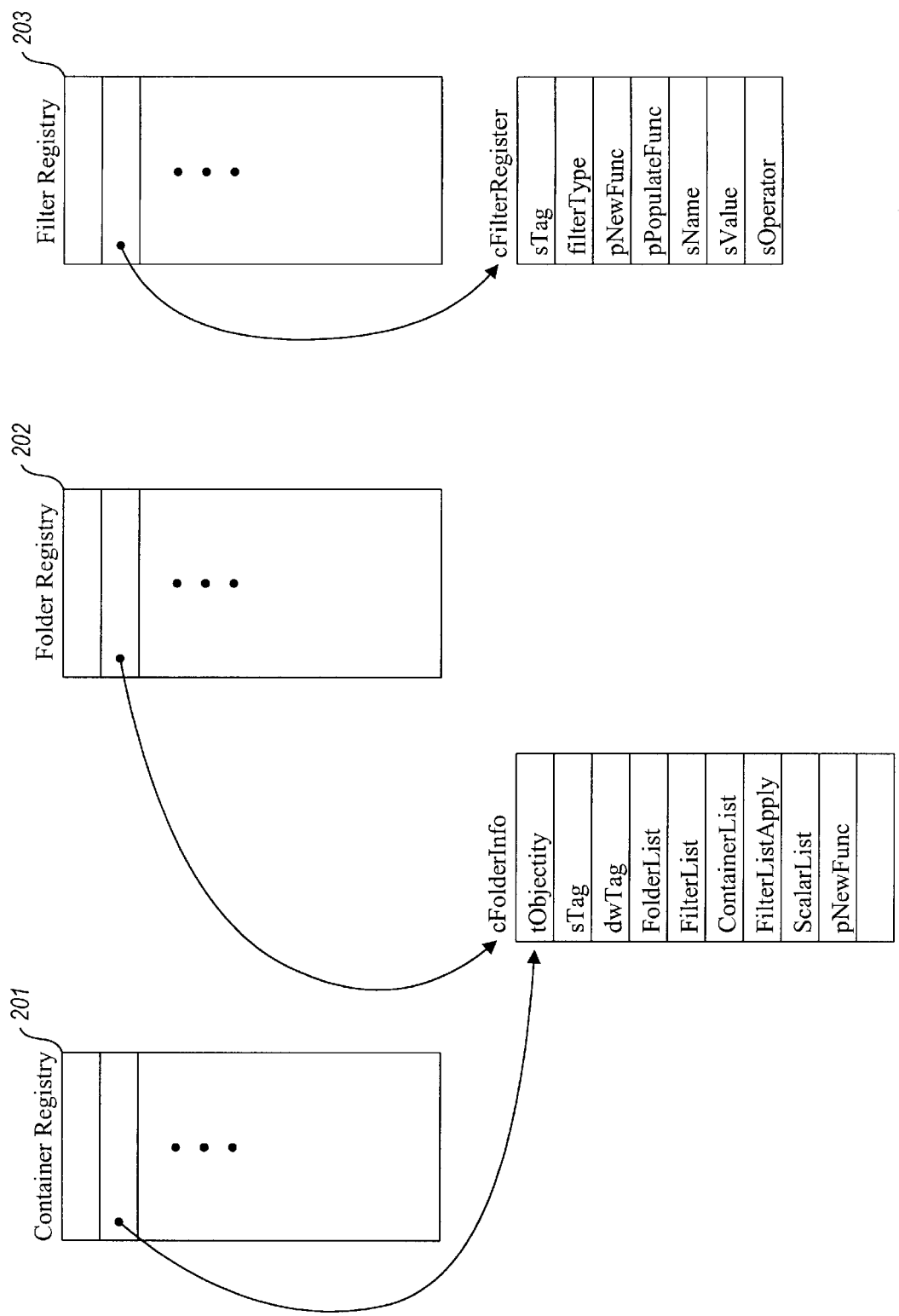
FIG. 2 illustrates the data structures maintained by the UDI registry.

The UDI Registry provides functionality that is common to all types of containers, folders, and filters. When a UDI mapper is initialized, it registers all the types of containers, folders, and filters that are defined for the data source. FIG. 2 illustrates the data structures maintained by the UDI registry. The UDI registry maintains a Container Registry 201, a Folder Registry 202, and a Filter Registry 203. The registries contain one entry for each container, folder, or filter type that has been registered with the UDI registry. Each entry points to either a CFolderInfo or a CFilterRegister class that defines the characteristics of the types. The UDI registry provides helper functions to register the types, to instantiate objects of the types, and to enumerate the characteristics of the types.

A CFolderInfo object contains information describing a container or folder type. The CFolderInfo object contains a flag indicating container or folder (tObjectity), a string with user readable indication of the type (sTag), an integer indicating the type (dwTag), a list of all the folder types that can be within this type of container or folder (FolderList), a list of all the filter types that can be applied to this container (FilterList), a list of all the scalars within the folder (ScalarList), and a pointer to a new function (pNewFunc) that is used to instantiate and initialize objects of this type.

A CFilterRegister object contains information describing a filter type. The CFilterRegister object contains a flag indicating the type of the filter (filterType), a string with a user readable indication of the filter type (sTag), a pointer to a new function (pNewFunc) that is used to instantiate and initialize objects of this filter type, and strings corresponding to the name, and value operator of the filter type.

A. Helper Functions

The UDI system provides this helper function which are invoked by the UDI API or the UDI mapper.

UDI_STATUS OttRegisterObjectity(CFolderInfo *pFInfo)

The OttRegisterObjectity function registers the container or folder type described by the specified information (CFolderInfo). This function stores a pointer to the passed CFolderInfo object either the container or folder registry based on whether a type for a container or folder is being registered.

UDI_STATUS OttDescribeFolder(BASETYPE tObjectity,
        DWORD dwTag, FOLDERINFO **ppFInfo)

The OttDescribeFolder function retrieves information (ppFInfo) relating to a type (dwTag) of either a container or folder (tObjectity) that have been registered. The function searches the appropriate Container or Folder registry.

UDI_STATUS OttRegisterFilter(CFilterRegister &fr)

The OttRegisterFilter function registers a filter type described by the specified information (fr). This function stores a pointer to the information into the Filter Registry.

UDI_STATUS OttNewContainer(DWORD cType, HANDLE hConnection, cContainer **ppContainer)

The OttNewContainer function instantiates and initializes a container object (ppContainer) of the specified type (cType) for the specified connection (hConnection). This function invokes the new function, which was registered for the specified container type passing the specified connection to the data source. The new function instantiates and initializes a container object of the specified type and returns a pointer to the container object.

UDI_STATUS OttCreateFilter(DWORD flType, HANDLE hConnection, cFilter **ppFilter)

The OttCreateFilter function instantiates and initializes a filter object (ppFilter) of the specified filter type (flType) for the specified connection (hConnection). This function invokes the new function, which was registered for the specified filter type passing the specified connection to the data source. The new function instantiates and initializes a filter object of the specified type and returns a pointer to the filter object.

UDI_STATUS OttEnumContainers(FOLDER_INFO **pData, DWORD *pCount)

The OttEnumContainers function returns an array (pData) and count (pCount) of FOLDER_INFO data structure describing the container types that have been registered.

UDI_STATUS OttEnumFolders(FOLDER_INFO **paFI[], DWORD *pCount)

The OttEnumFolders function returns an array (paFI) and count (pCount) of FOLDER_INF data structures describing the folder types that have been registered.

UDI_STATUS OttEnumFilters(FILTER_INFO *paFI, DWORD *pCount)

The OttEnumFilters function returns an array (paFI) and count (pCount) of FILTER_INFO data structures describing the filter types that have been registered.

B. Helter Classes

The UDI system provides these helper classes for the CObjectity Mapper.

CObjectivity
Class CObjectity
{
public:
BASETYPE fBaseType;
DWORD _fType;
UDI_STATUS GetFolderTypes(DWORD *pfTypes, DWORD *pctTypes);
DWORD GetModified();
void SetModified(DWORD fModified);
virtual UDI_STATUS LinkFolder(CFolder *pFolder);
DWORD GetType(){return(_fType);}
virtual UDI_STATUS Unlink(CFolder *pFolder);
virtual UDI_STATUS GetFolderCount(DWORD fType, DWORD *pctFolders )=0;
virtual UDI_STATUS Rewind(DWORD fType)=0;
virtual UDI_STATUS GetNextFolder(DWORD fType, HANDLE *pHFolder)=0;
virtual UDI_STATUS CreateFolder(
  DWORD fType,
  const char *pszFolderID,
  HANDLE *phFolder)=0;
protected:
CDWordArray_SubFolderTypes;
CObArray_FolderList;
CObArray_ActiveFilterList;
CObArray_FilterList;
CObjectity *_pParent;
DWORD _fAccess;
DWORD _fModified;
HANDLE_hConnection;
int_iActive;
int_iPercolator;
CDWordArray_AcceptFilterTypes;
DWORD_dwPopFlags;
CNotifyFoater *_pNotifyFloat;
};

The CObjectity class is the base class for all container and folder objects. The UDI system provides an implementation for certain function members of the class. The UDI system also provides implementations of other function members in derived class. Implementations of certain functions of certain function members are provided by the UDI mapper. The CObjectity class contains data members indicating whether it is a container or a folder object (fBaseType), indicating the container and filter type (_fType), listing the folder types that can be in this container or folder (_SubFolderTypes), listing the folders currently contained in this container or folder (_FolderList), listing the active filters (_ActiveFilterList), listing the percolating filters (_FilterList), pointing to the parent (_pParent), indicating the access right to container and folder (_fAccess), indicating whether the object has been modified (_fModified), pointing to the connection (_hConnection), indexing the active filter list (_iActive), and indexing the percolating filter list (iPercolatorList), a listing filter type that can be accepted (_AcceptFilter Types) populate flag (_dwPopFlags), and a pointer to a NotifyFloater object (_pNotifyFloat). The class also contains methods for returning the list of folders that this object can contain, for returning the current count of the number of folders in the object, for rewinding the object, for retrieving the next folder within the object, for removing a folder from the object, for creating a folder, for retrieving and setting the modified flag, for linking to a folder, for retrieving the type of the object, for adding a filter to the active or percolating filter list, for retrieving the percolating filter list, for retrieving the next filter, for retrieving the next filter of a certain type, and for returning a pointer to the first filter in the filter list of the specified type.

UDI_STATUS CObjectity::GetFolderTypes(DWORD *pfTypes, DWORD *pctTypes)

The GetFolderTypes method returns an array (pfType) and count (pctTypes) with each of the folder types that this folder object can contain. The data member (_SubFolderTypes) contains the type.

UDI_STATUS CObjectity::GetModified()

UDI_STATUS CObjectity::SetModified(DWORD fModified)

The GetModified and SetModified methods get and sent the modified flag, respectively.

UDI_STATUS CObjectity::Unlink(CFolder *pFolder)

The Unlink method unlinks the specified folder (pFolder) from this object. The method also checks the seed of the folder to determine if multiple folders point to it.

UDI_STATUS CObjectity::LinkFolder(cFolder *pFolder)

The LinkFolder method ensures that the specified folder is not already in the folder list of the object and then adds the specified folder to the folder list.
CContainer
Class CContainer: public CObjectity
{
public:
virtual UDI_STATUS SetFilter(CFilter *pFilter);
UDI_STATUS RetrieveFilters(HANDLE *pahFilters, DWORD *pct);
virtual UDI_STATUS Populate(DWORD dwOpts, NOTIFY *pNotify )=0;
virtual UDI_STATUS CreateFolder(DWORD fType, const char *pszFolderID, HANDLE *phFolder)=0;
virtual UDI_STATUS Write(CFolder *pFolder);
protected:
BOOL_bPopulated;
DWORD_dwCurrentFolder,
DWORD_ctFolders;
};

The class CContainer is the class for a container object. The UDI system provides the implementation of certain function members, but the UDI mapper provides implementation of certain other function members.

UDI_STATUS CContainer::SetFilter(cFilter pFilter);

The SetFilter method applies the specified filter to the container object. The method checks the container registry to determine if the specified filter object can be applied to this container object based on types. The method also determines whether the container object has been populated. If its been populated, then a filter cannot be applied. The method also ensures that the connection for the filter is the same as the connection for the container object. The method then stores a pointer to the filter object in the filter list of the container object.

UDI_STATUS CContainer::RetrieveFilters(HANDLE pahFilters, DWORD *pCount)

The RetrieveFilters method returns an array (pahFilters) and a count (pCount) of pointers to the filters in the active and percolating filter list for this container object.
CFolder
Class CFolder: public CObjectity
{
public:
virtual UDI_STATUS GetFolderByID(DWORD fType, char *pszID, HANDLE *phFolder)=0;

void ContainsFolder(DWORD folderType);
virtual UDI_STATUS CreateFolder(DWORD fType, const char *pszFolderID, HANDLE *phFolder)=0;
virtual UDI_STATUS Commit()=0;
UDI_STATUS SetScalar(SCALAR *pScalarStruct);
virtual UDI_STATUS Validate()=0;
virtual UDI_STATUS Link();
virtual UDI_STATUS Unlink();
UDI_STATUS GetScalarCount(DWORD *pctScalars);
UDI_STATUS GetNextScalar(SCALAR *pScalarStruct);
UDI_STATUS GetScalarByName(const char *pszName, SCALAR *pScalarStruct);
UDI_STATUS Open();
UDI_STATUS Close();
virtual UDI_STATUS GetID(char *pszID);
UDI_STATUS GetFolderType(DWORD *pfType, char *pszfType);
virtual BOOL SupportsExpression() {retur(FALSE);}
static DWORD ctOpenFolders;
BOOL_bCreateState;
void ParentDying();
CFloater* pSeed;
DWORD UseCount() {return(_ctUse);}
private:
DWORD_ctUse;
protected:
CString_sID;
BOOL_bInitialised;
CObArray_ScalarList;.
DWORD_dwCurrentScalar;.
DWORD_ctScalars;
};

UDI_STATUS CFolder::ContainsFolder(DWORD folderType)

The ContainsFolder method adds the specified folder type (folderType) to the list of folders that can be contained within this folder object.

UDI_STATUS CFolder::Unlink()

The Unlink method unlinks the folder object from its parent by invoking the Unlink method of the parent and then setting the modified flag of this folder object to deleted.

UDI_STATUS CFolder::Link()

The Link method adds the folder object to its parent list of folders. This method invokes the Link method of its parent. However, if the parent data member of this folder object is null, then the parent has already been closed and cannot be linked.

UDI_STATUS CFolder::ParentDying()

The ParentDying method sets the pointer to this parent of this folder object to null.

UDI_STATUS CFolder::Open()

The Open method increments the use count of this folder object.

UDI_STATUS CFolder::Close()

The Close method decrements the use count of the folder object. If the use count is decremented to zero, then the folder object is deleted.

UDI_STATUS CFolder::GetID (char *pszID)

The GetID method returns the ID (pszID) of the folder object.

UDI_STATUS CFolder::GetFolderType (DWORD *pfType, Char *pszfType)

The GetFolderType method returns the folder type of this folder object as both a character string (pszfType) and a flag (pfType).

UDI-STATUS CFolder::GetScalarCount (DWORD *pctScalars)

The GetScalarCount method returns the count of the scalars within this folder object.

UDI_STATUS CFolder::GetNextScalar(SCALAR *pScalarStruct)

The GetNextScalar method returns the scalar from the scalar list indicated by the current scalar data member and increments the current scalar data member.

UDI_STATUS CFolder::GetScalarByName(const char *pszName, SCALAR *pScalarStuct)

The GetScalarByName method is passed the name (pszName) of a scalar, searches through the scalar list looking for a scalar of that name, and returns a scalar data structure (pScalarStruct).

UDI_STATUS CFolder::SetScalar(SCALAR *pScalarStruct)

The SetScalar method ensures that the folder object can be modified, locates the scalar in the scalar list by the name (in the pScalarStruct) and sets the value of the scalar based on the specified function.

The UDI system also preferably provides classes for filters and filter containers. The UDI system defines and implements methods for creating a filter by adding tokens, retrieving tokens, and persistently storing the filter.

IV. UDI Mapper

The UDI mapper maps the data of a data source with a predefined organization into the UDI model. The UDI mapper is a collection of implementations of C++ classes for the specific types of containers, folders, and filters supported by a data source. The UDI mapper also contains a function that is invoked initially by the UDI system to register these types with the UDI Registry. The data source specific classes inherit the base classes supplied by the UDI system. In this way, the UDI system can access objects of these specific classes in a uniform manner. When a UDI registry function is invoked to create or open a container, folder, or filter, the UDI registry retrieves the reference to a UDI mapper supplied function from its registry. The IDI mapper supplied function controls the installation of object the implement behavior customized to the data source.

V. Sample Browser

Figure 2A:
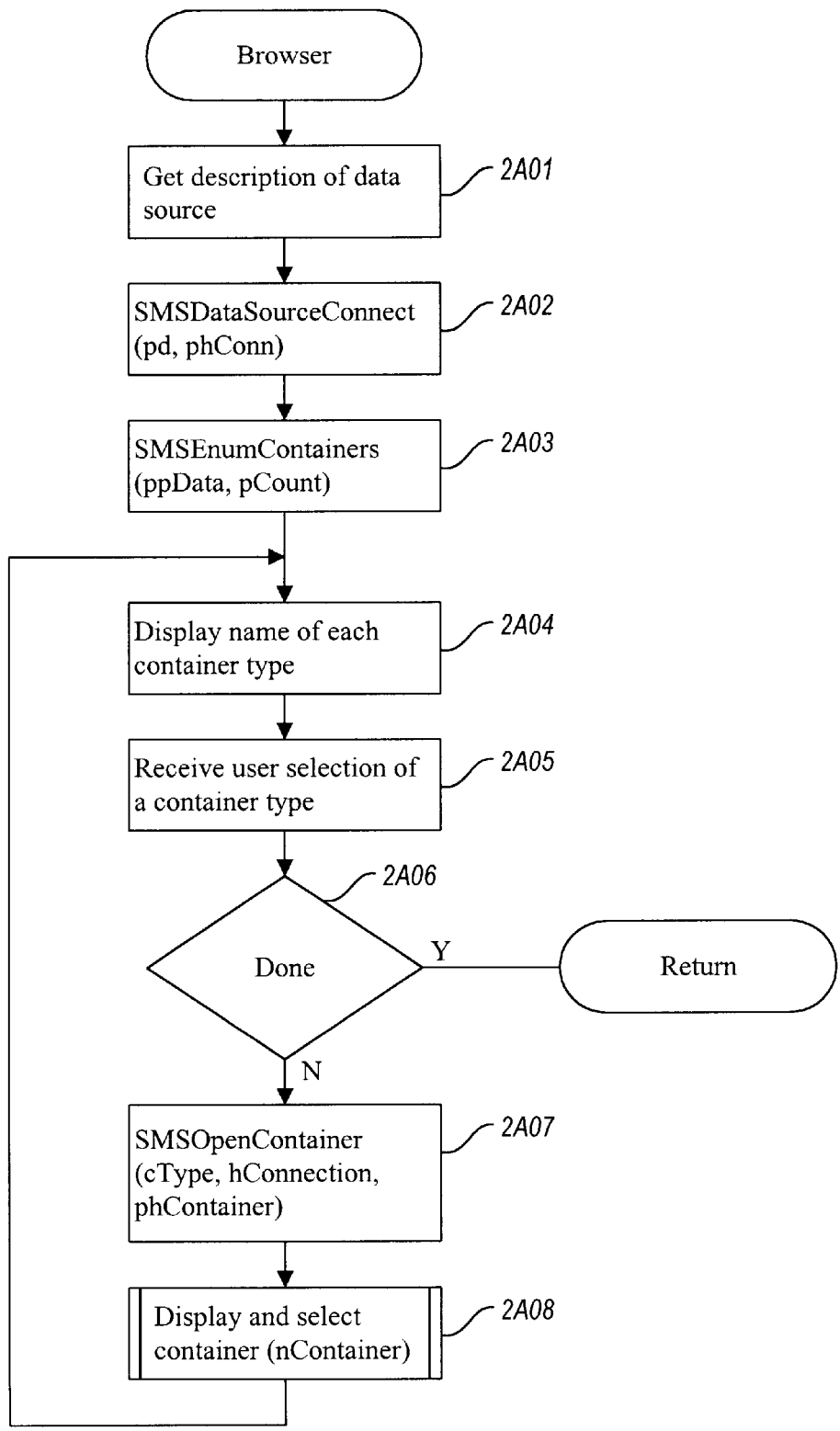
FIG. 2A is a flow diagram of the browser.

FIG. 2A is a flow diagram of the browser. The browser is a sample application that can connect to any data source with a UDI mapper. In step 2A01, the browser retrieves the description of the data source. This description includes information needed to connect to the data source. This information would typically be input by a user of the browser. In step 2A02, the browser invokes the UDIDataSourceConnect function to connect the data source. In step 2A03, the browser invokes the UDInumContainers function to retrieve a list of the types of containers for the data source. In steps 2A04–2A08, the browser loops waiting for a user to select the type of container. In step 2A04, the browser displays the name of each container type. In step 2A05, the browser receives a user selection of a container type. In step 2A06, if the user indicates the browser is done, then the browser returns, else the browser continues at step 2A07. In step 2A07, the browser invokes the UDIOpenContainer function to open a container of the type designated selected by the user. In step 2A08, the browser invokes the routine display and select folder (described below) to display and select the folders within the selected container.

Figure 2B:
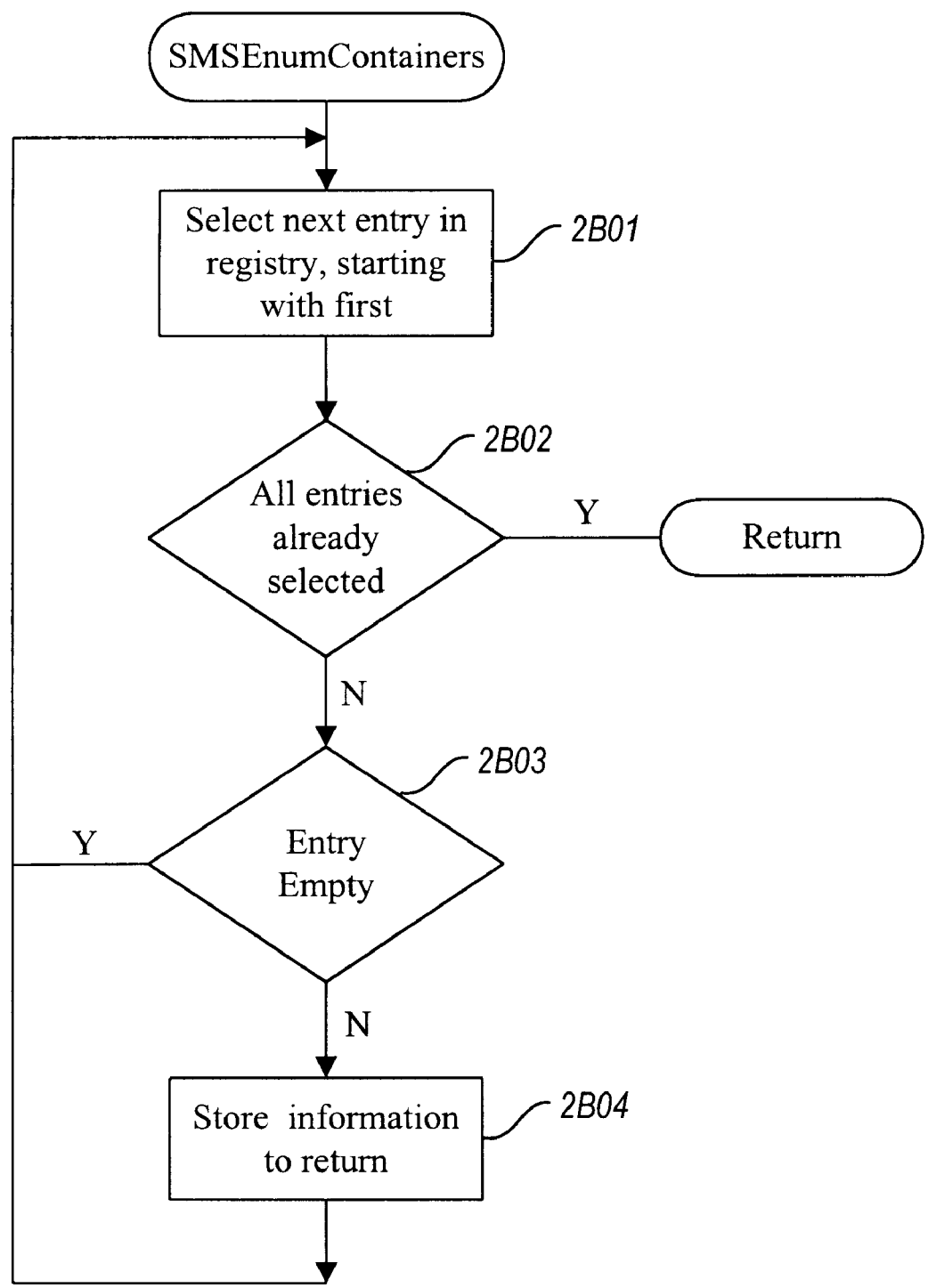
FIG. 2B is a flow diagram of the UDIEnumContainers function.

FIG. 2B is a flow diagram of the UDIEnumContainers function. In step 2B01, the function selects the next entry in the container registry, starting with the first. In step 2B02, if all the entries in the container registry have already been selected, then the function returns, else the function continues at step 2B03. In step 2B03, if the selected entry is empty, then the function loops to step 2B01, else the function continues at step 2B04. An empty entry indicates that a container type has been deleted. In step 2B04, the function saves the information to return and then loops to step 2B01 to select the next entry.

Figure 2C:
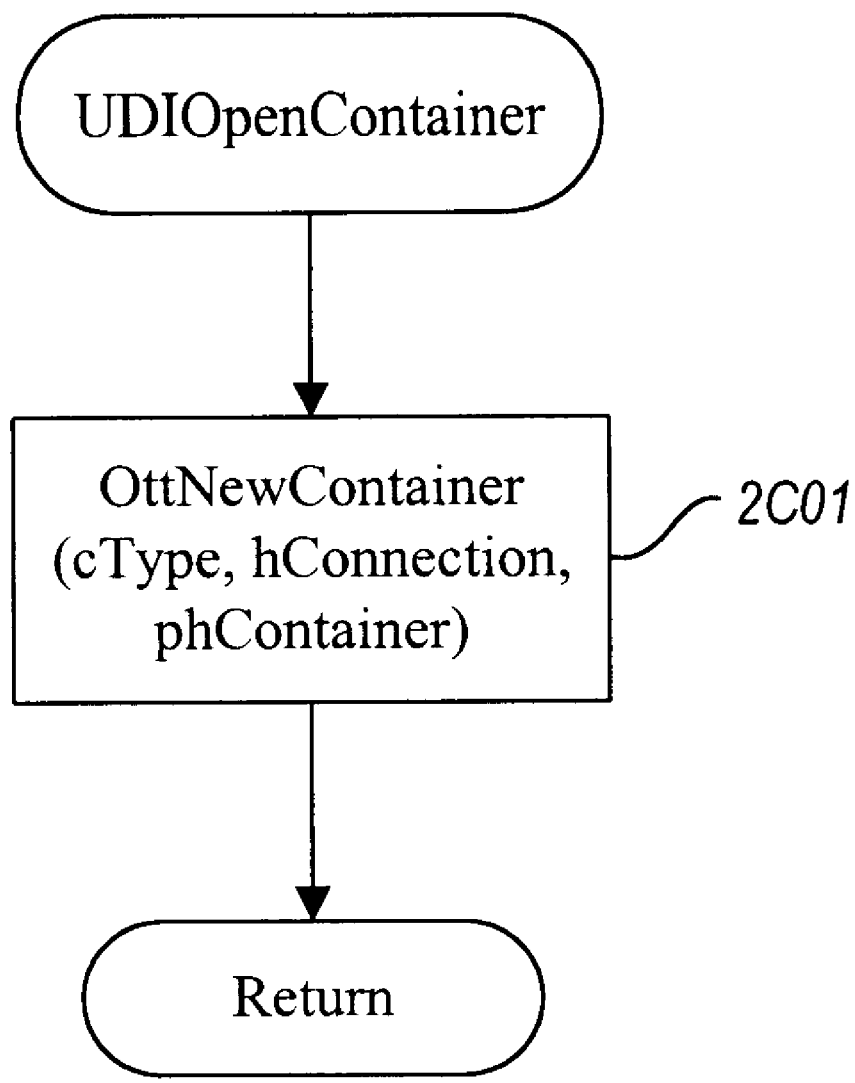
FIG. 2C is a flow diagram of the UDIOpenContainer function.

FIG. 2C is a flow diagram of the UDIOpenContainer function. In step 2C01, the function invokes the OttNewContainer function to open a new container of the specified type and returns.

Figure 2D:
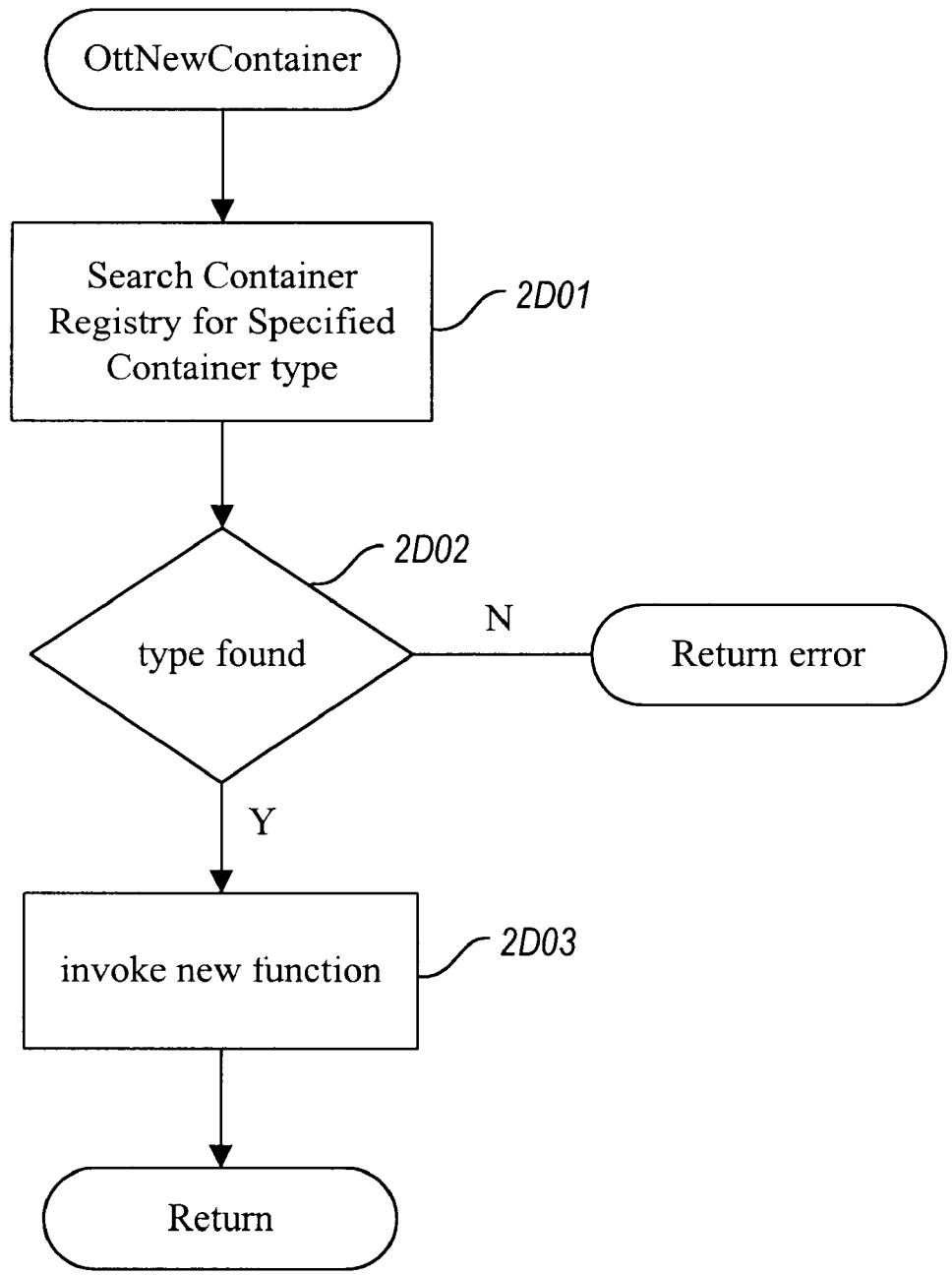
FIG. 2D is a flow diagram of the OttNewContainer function.

FIG. 2D is a flow diagram of the OttNewContainer function. In step 2D01, the function searches the container registry for the container of the specified type. In step 2D02, if an entry with that type has been found, then the function continues at step 2D03, else the function returns an error. In step 2D03, the procedure invokes the new function for that container type that is referenced by the entry and returns.

Figure 2E:
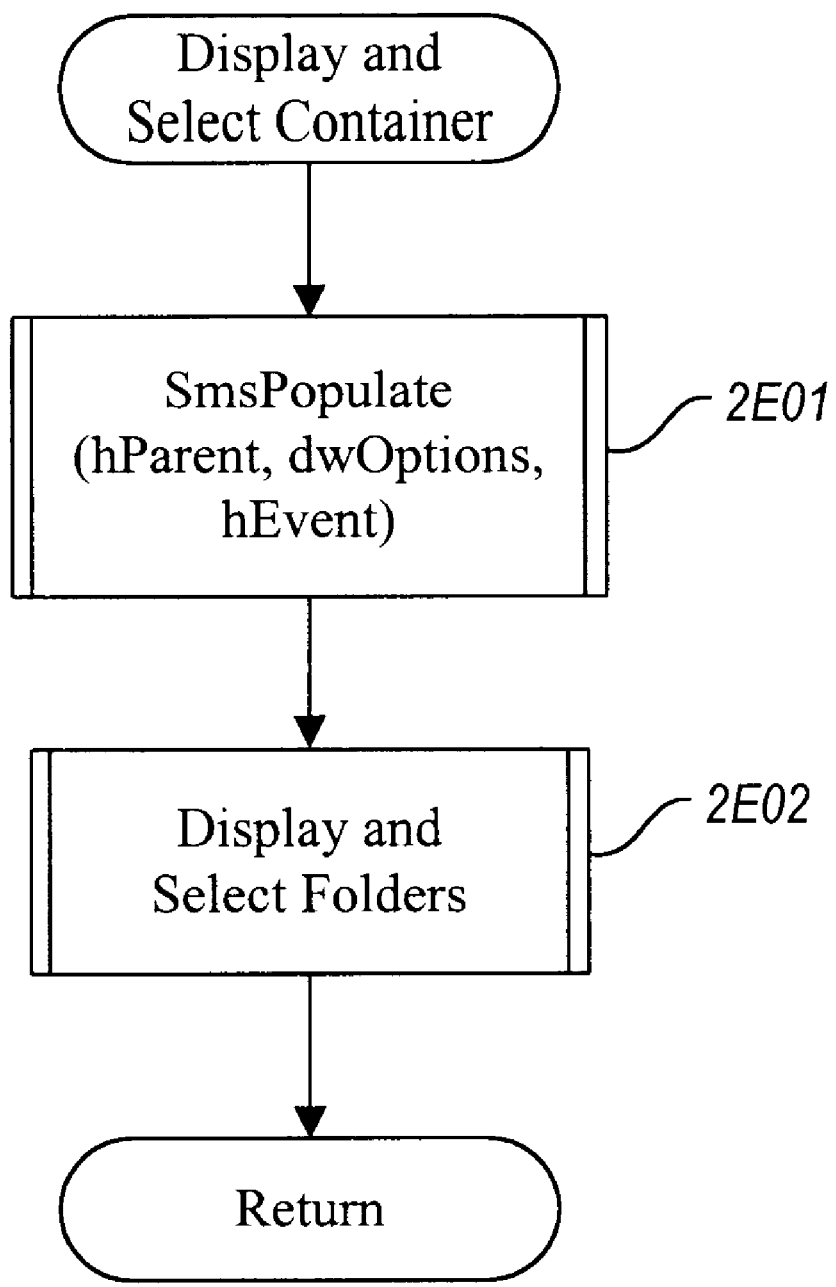
FIG. 2E is a flow diagram of the routine display and select container.

FIG. 2E is a flow diagram of the routine display and select container. In step 2E01, the routine invokes the UDIPopulate function to populate the selected container with its folder. In step 2E02, a routine invokes a routine display and select the folders (described below) within the populated container and returns.

Figure 2F:
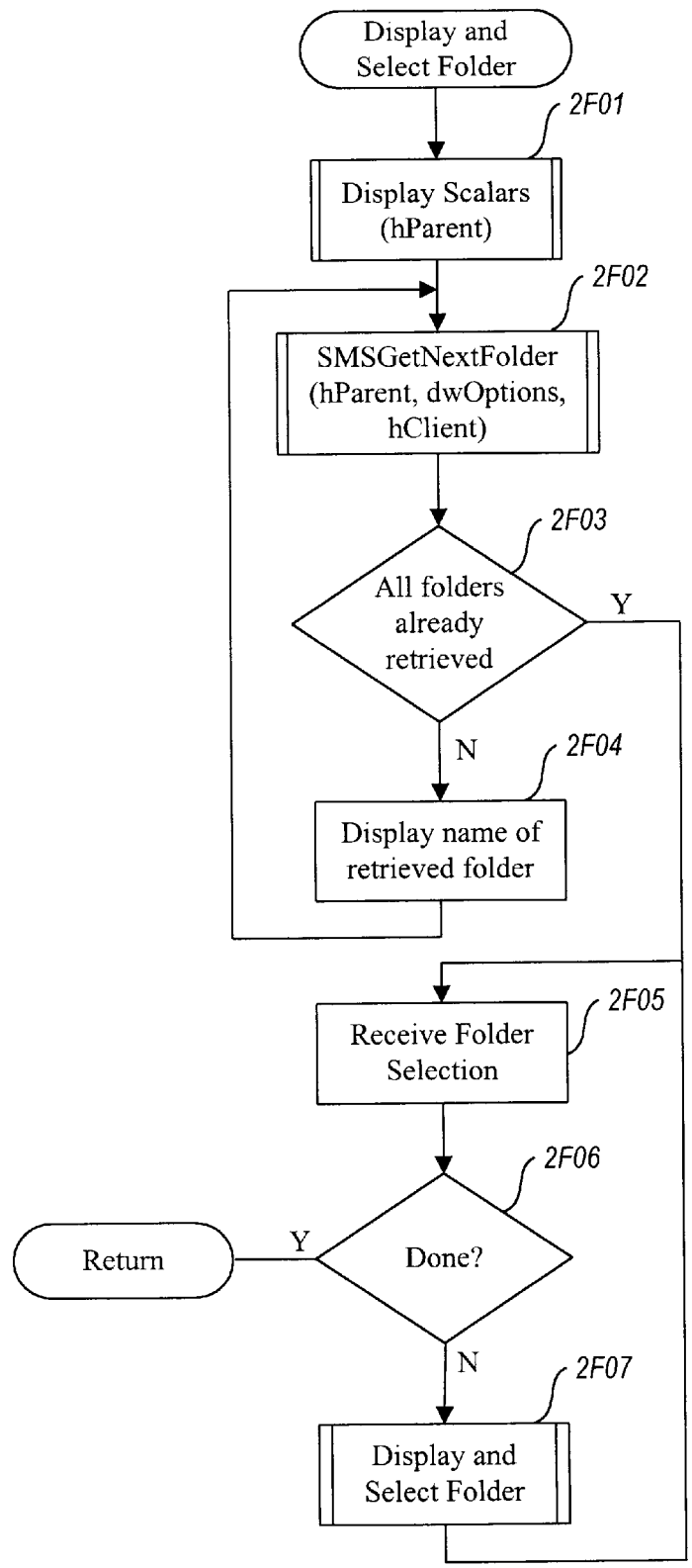
FIG. 2F is a flow diagram of the routine display and select folder.

FIG. 2F is a flow diagram of the routine display and select folder.

In step 2F01, the routine invokes a routine to display the scalars (described below) associated with the folder. In steps 2F02–2F04, the routine loops retrieving each folder within the parent. In step 2F02, the routine invokes the UDIGetNextFolder function. In step 2F03, if all the folders have already been retrieved, then the routine continues at step 2F05, else the routine continues at step 2F04. In step 2F04, the routine displays the name of the retrieved folder and loops to step 2F02 to get the next folder. In step 2F05, the routine receives a user selection of the displayed name of a retrieve folder. In step 2F06, if the user indicates that the selection process is done for this level, then the routine returns, else the routine continues at step 2F07. In step 2F07, the routine recursively invokes the routine to display the select folders to display the information for the selected folder and loops to step 2F05 to retrieve the next folder selection.

Figure 2G:
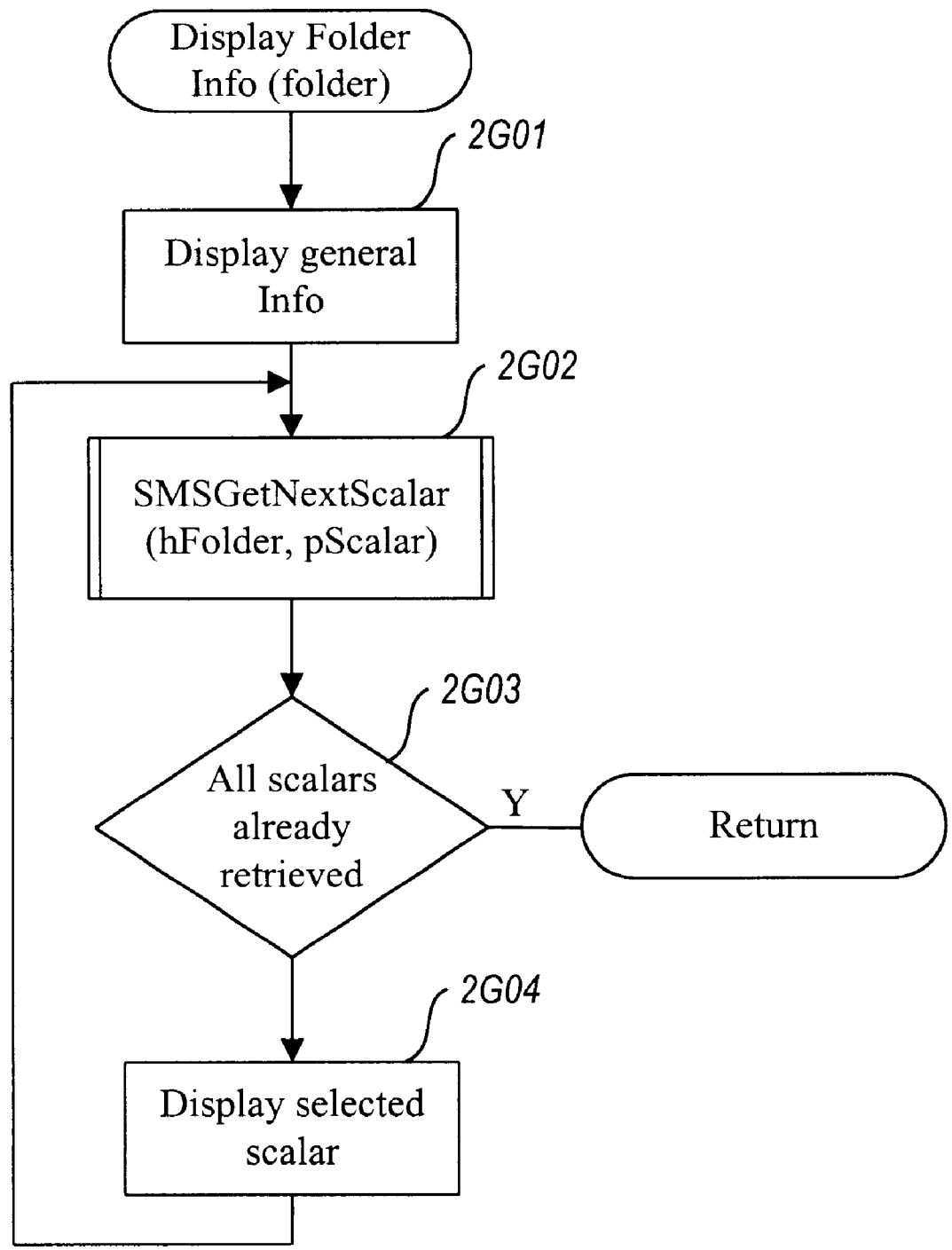
FIG. 2G is a flow diagram of the routine to display folder information.

FIG. 2G is a flow diagram of the routine to display folder information. In step 2G01, the routine displays general information about a folder such as its types. In step 2G02–2G04, the routine loops processing each scalar. In step 2G02, the routine invokes the UDIGetNextScalar function to retrieve the next scalar defined for the folder. In step 2G03, if all the scalars have already been retrieved then the routine returns, else the routine continues at step 2G04. In step 2G04, the routine displays the selected scalar and loops to step 2601.

Figure 2H:
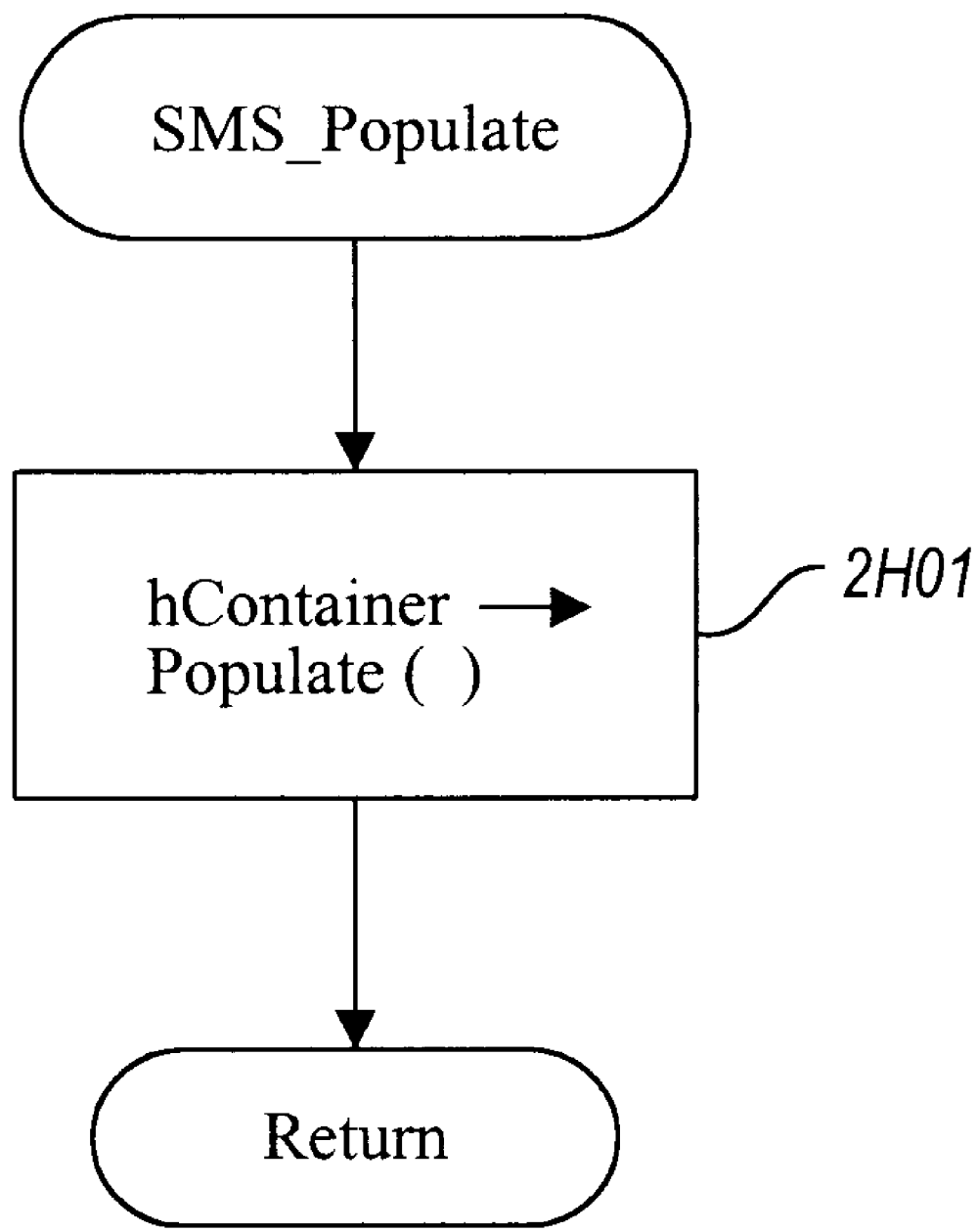
FIG. 2H is a flow diagram of the UDIPopulate function.

FIG. 2H is a flow diagram of the UDIPopulate function. In step 2H01, the procedure invokes the populate method of the container object and returns.

Figure 2I:
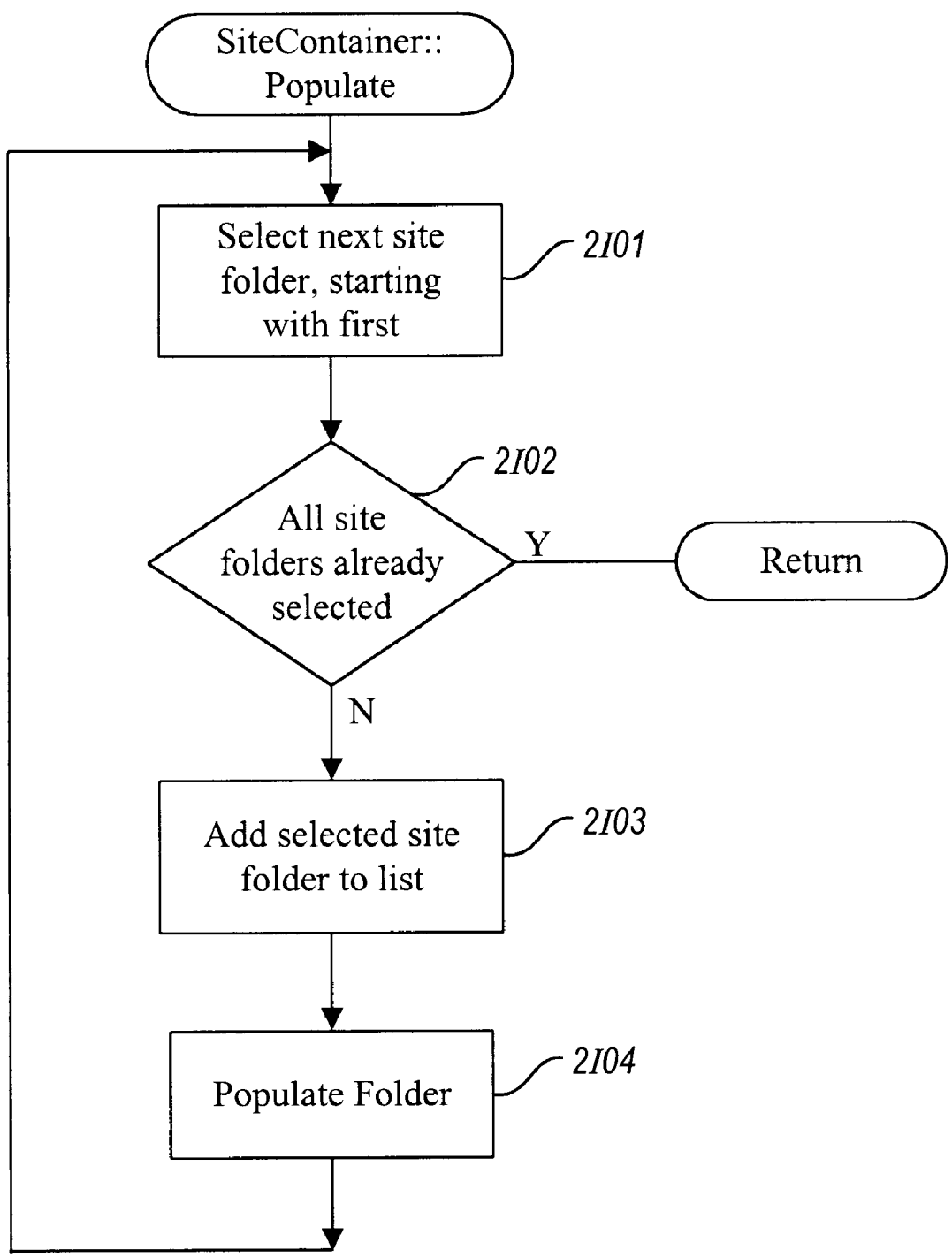
FIG. 2I is a sample flow diagram of the populate method of a certain container type.

FIG. 2I is a sample flow diagram of the populate method of a certain container type. The implementation of the populate method is provided by the UDI mapper. In step 2I01, the procedure selects the first data object in the data source corresponding to the folders that are contained within this type of container. In step 2I02, if all the data objects have already been selected, then the method returns, else the method continues at step 2I03. In step 2I03, the method adds the selected a folder for the selected data object to the list. In step 2I04, the method performs the data source specific behavior to populate the container with the selected folder.

Although the present invention has been described in terms of a preferred embodiment, it is not intended that the invention be limited to this embodiment. Modifications within the spirit of the invention will be apparent to those skilled in the art. The scope of the present invention is defined by the claims that follow.

We claim:

1. A method in a computer system for filtering data organized into containers, each container containing data of a certain type, each container containing one or more folders corresponding to instances of data of the certain type, each folder containing scalars and optionally containing sub-folders, the method comprising:

receiving a plurality of filters to apply to a container for data of a certain type, each filter indicating which folders or sub-folders are to be selected;

determining which filters are activatable by the container and activating those filters determined to be activatable to select from among those folders within the container only those folders that pass the activated filters; and for each folder that is selected, activating those filters of the received plurality of filters that have not yet been activated to select sub-folders of the selected folder.

2. The method of claim 1 wherein each filter specifies a logical operation to be performed on the scalars of a folder.

3. The method of claim 2 wherein some of plurality of filters are stored persistently with the data of the container.

4. A method in a computer system for filtering data organized hierarchically into levels of folders contained within other folders, the hierarchy having a root folder, the method comprising:

passing a plurality of filters to the root folder, each passed filter indicating which folders or sub-folders are to be selected;

for each folder in the hierarchy,
determining which of the passed filters can be used to select folders within that folder; and
selecting folders that are within that folder that pass each determined filter; and passing those passed filters which are not used to select folders to each selected folder so that the filters percolate down to the folders at which they can be used.

5. The method of claim 4 wherein each filter has a filter type, each folder has a folder type, and each folder type has a list of filter types that can be used to select folders within folders of that folder type.

6. A computer-readable medium containing instructions for causing a computer system to filter data hierarchically organized into one or more folders within a container, each folder optionally containing sub-folders, by:

receiving filters to apply to the container, each filter indicating which folders or sub-folders are to be selected;

determining which filters are activatable by the container and activating those filters determined to be activatable to select from among those folders within the container only those folders that pass the activated filters; and for each folder that is selected, activating those filters of the received plurality of filters that have not yet been activated to select sub-folders of the selected folder.

7. The computer-readable medium of claim 6 wherein the folders contain scalars and each filter specifies a logical operation to be performed on the scalars of a folder.

8. The computer-readable medium of claim 7 wherein some of plurality of filters are stored persistently with the data of the container.

9. A computer system for selecting data organized hierarchically into levels of folders contained within other folders, the hierarchy having a root folder, comprising:

means for passing filters to the root folder, each passed filter indicating which folders at each level are to be selected;

means for determining which of the passed filters can be used to select folders within each folder in the hierarchy;

means for selecting folders that are within each folder in the hierarchy such that the selected folders pass each determined filter; and means for passing those passed filters which are not used to select folders to each selected folder so that the filters percolate down to the folders at which they can be used.

10. The computer system of claim 9 wherein each filter has a filter type, each folder has a folder type, and each folder type has a list of filter types that can be used to select folders within folders of that folder type.

11. The method of claim 1 wherein each received filter has a filter type and the container has an applicable list of filter types that are applicable to the container and including suppressing the applying of a received filter to the container when the filter type of that received filter is not in the applicable list.

12. The method of claim 1 wherein each received filter has a filter type and the container has an activatable list of filter types that are activatable by the container and including activating for the container only those received filters whose filter types are in the activatable list.

13. The method of claim 1 wherein each received filter has a filter type and a folder has an activatable list of filter types that are activatable by the folder and including activating for the folder only those received filters that were not activated by the container and whose filter types are in the activatable list of filter types for the folder.

14. The method of claim 1 wherein each received filter has a filter type and the container has an applicable list of filter types that are applicable to the container and an activatable list of filter types that are activatable by the container and including activating for the container only those filters whose filter types are determined to be in both the applicable list and the activatable list.

15. The method of claim 14 wherein a folder has an activatable list of filter types that are activatable by the folder and including activating for the folder only those received filters that were not activated by the container and whose filter types are in the activatable list of filter types for the folder, but not in the applicable list of filter types for the container.

16. The method of claim 4 wherein each passed filter has a filter type and the root folder has an activatable list of filter types that are activatable by the root folder and wherein the determining of which of the passed filters can be used to select folders within the root folder determines whether the filter type of each passed filter is in the activatable list.

17. The method of claim 4 wherein each passed filter has a filter type and a folder has an activatable list of filter types that are activatable by the folder and wherein the determining of which of the passed filters can be used to select folders within the folder determines whether the filter type of each passed filter is in the activatable list.

18. The method of claim 4 wherein each passed filter has a filter type and the hierarchy has an applicable list of filter types that are applicable to the hierarchy and wherein any filters whose filter type is not in the applicable list is not used for filtering folders of the hierarchy.

19. The computer-readable medium of claim 6 wherein each received filter has a filter type and the container has an applicable list of filter types that are applicable to the container and including suppressing the applying of a received filter to the container when the filter type of that received filter is not in the applicable list.

20. The computer-readable medium of claim 6 wherein each received filter has a filter type and the container has an activatable list of filter types that are activatable by the container and including activating for the container only those received filters whose filter types are in the activatable list.

21. The computer-readable medium of claim 6 wherein each received filter has a filter type and a folder has an activatable list of filter types that are activatable by the folder and including activating for the folder only those received filters that were not activated by the container and whose filter types are in the activatable list of filter types for the folder.

22. The computer-readable medium of claim 6 wherein each received filter has a filter type and the container has an applicable list of filter types that are applicable to the container and an activatable list of filter types that are activatable by the container and including activating for the container only those filters whose filter types are determined to be in both the applicable list and the activatable list.

23. The computer-readable medium of claim 22 wherein a folder has an activatable list of filter types that are activatable by the folder and including activating for the folder only those received filters that were not activated by the container and whose filter types are in the activatable list of filter types for the folder, but not in the applicable list of filter types for the container.

24. The computer system of claim 9 wherein each passed filter has a filter type and the root folder has an activatable list of filter types that are activatable by the root folder and wherein the means for determining which of the passed filters can be used to select folders within the root folder determines whether the filter type of each passed filter is in the activatable list.

25. The computer system of claim 9 wherein each passed filter has a filter type and a folder has an activatable list of filter types that are activatable by the folder and wherein the means for determining which of the passed filters can be used to select folders within the folder determines whether the filter type of each passed filter is in the activatable list.

26. The computer system of claim 9 wherein each passed filter has a filter type and the hierarchy has an applicable list of filter types that are applicable to the hierarchy and wherein any filters whose filter type is not in the applicable list is not used for filtering folders of the hierarchy.

* * * * *

UNITED STATES PATENT AND TRADEMARK OFFICE
CERTIFICATE OF CORRECTION

PATENT NO. : 5,974,410
DATED : October 26, 1999
INVENTOR(S) : Bruce W. Copeland, Johnathan I. Shuval It is certified that error appears in the above-identified patent and that said Letters Patent is hereby corrected as shown below:

Cover Page ln 14 of abstract: after "folders that" change "represents" to --represent--

Col. 1, ln. 53: after "folders that" change "represents" to --represent--

Col. 3, ln. 10: after "application that" change "defined" to --defines--

Col. 3, ln. 55: before "several" change "provide" to --provides--

Col. 8, ln. 48: change "*ptScalars);" to --*pctScalars);--

Col. 9, ln. 49: after "UDI_STATUS" change "UDiGetNextFilter" to --UDIGetNextFilter--

Col. 10, ln. 36: after "is used" insert --to--

Col. 10, ln. 37: after "persistent" delete [is]

Col. 13, ln. 50: after "typedef" change "struct)TOKEN" to --struct_TOKEN--

Col. 15, ln. 44: after "B." change "Helter" to --Helper--

Col. 18, ln. 22: after "Expression()" change "{retur(FALSE);} to --{return(FALSE);}

Col. 19, ln. 18: change "*pszfType)" to --*pszFType)--

UNITED STATES PATENT AND TRADEMARK OFFICE
CERTIFICATE OF CORRECTION

PATENT NO. : 5,974,410

DATED : October 26, 1999

INVENTOR(S) : Bruce W. Copeland, Johnathan I. Shuval

It is certified that error appears in the above-identified patent and that said Letters Patent is hereby corrected as shown below:

Col. 20, ln. 2: after "The" change "IDI" to --UDI--

Col. 20, ln. 15: after "invokes the" change "UDInumContainers" to --UDIEnumContainers--

Col. 21, ln. 18: after "to step" change "2601" to --2G01--

Signed and Sealed this

Twelfth Day of December, 2000

Attest:

Q. TODD DICKINSON

*Attesting Officer*  *Director of Patents and Trademarks*